United States Patent
Allen, Jr. et al.

(10) Patent No.: US 7,588,483 B1
(45) Date of Patent: Sep. 15, 2009

(54) METHOD OF DRY GRINDING, COLORING AND POLISHING CONCRETE SURFACES

(75) Inventors: John J. Allen, Jr., Phoenixville, PA (US); John A. Jones, Pottstown, PA (US)

(73) Assignee: Allen Jones Industries, LLC., Pottstown, PA (US)

( * ) Notice: Subject to any disclaimer, the term of this patent is extended or adjusted under 35 U.S.C. 154(b) by 0 days.

(21) Appl. No.: 11/825,714

(22) Filed: Jul. 9, 2007

(51) Int. Cl.
*B24B 1/00* (2006.01)
(52) U.S. Cl. .......................... 451/41; 451/57
(58) Field of Classification Search ............ 451/41, 451/57, 58, 353, 359, 354; 125/25
See application file for complete search history.

(56) References Cited

U.S. PATENT DOCUMENTS

| | | | |
|---|---|---|---|
| 3,934,377 A | 1/1976 | Tertinek | 51/177 |
| 4,295,243 A | 10/1981 | King | 15/320 |
| 4,317,314 A | 3/1982 | Carlstrom et al. | 51/177 |
| 4,614,063 A | 9/1986 | Crivaro et al. | 51/174 |
| 4,727,686 A | 3/1988 | Persson | 51/174 |
| 5,454,751 A | 10/1995 | Wiand | 451/526 |
| 5,605,493 A | 2/1997 | Donatelli et al. | 451/41 |
| 6,155,907 A | 12/2000 | Jones | 451/28 |
| 6,454,632 B1 * | 9/2002 | Jones et al. | 451/28 |
| 6,475,067 B1 | 11/2002 | Jones et al. | 451/41 |
| 6,860,794 B1 | 3/2005 | Palushi et al. | 451/41 |
| 2007/0264917 A1 * | 11/2007 | Lundberg et al. | 451/353 |

* cited by examiner

*Primary Examiner*—Robert Rose
(74) *Attorney, Agent, or Firm*—Michael F. Petock, Esq.; Petock & Petock, LLC

(57) ABSTRACT

A method of polishing and coloring concrete surfaces using a dry concrete grinding process which includes locking in dye colors by applying the dye to the cementicious surface mid way during a series of grinding steps using sequentially finer grit, and then applying a sealer after the dye has dried and continuing the grinding process with sequentially finer polishing grits after the sealer has dried and hardened. A second coat of sealer is then applied at the end of the grinding process. In a presently preferred embodiment, the dye is applied after grinding with a grit of substantially 400 grit, the sealer is applied after the dye is dry and grinding is continued up to about 3000 grit after the first coat of sealer dries. Lastly, a second coat of sealer is applied.

8 Claims, No Drawings

METHOD OF DRY GRINDING, COLORING AND POLISHING CONCRETE SURFACES

CROSS REFERENCE TO RELATED PATENT

The present invention is related to the teachings of U.S. Pat. No. 6,475,067 B1 entitled DRY METHOD OF CONCRETE FLOOR RESTORATION filed by the inventors herein, and the teachings of the aforesaid patent are incorporated herein by reference.

FIELD OF THE INVENTION

The present invention relates to the coloring of concrete and other cementicious surfaces. More particularly, the present invention relates to the coloring of concrete and/or cementicious surfaces in the process of dry concrete and cementicious surfaces polishing as taught in U.S. Pat. No. 6,475,067 B1.

Throughout, use of the word concrete will be understood to include any cementicious surface.

BACKGROUND OF THE INVENTION

Concrete is a widely used and relatively inexpensive building material. However, concrete typically has a relatively rough or porous surface. Many times it is desirable to enhance the surface appearance to provide a smoother appearance with a luster. A method of providing such a lustrous surface on concrete using a dry method of concrete grinding is disclosed and claimed in U.S. Pat. No. 6,475,067 B1, the teachings of which are incorporated herein.

In addition, it is also desirable to have concrete colored to enhance its appearance in a particular setting.

SUMMARY OF THE INVENTION

An advantage of the present invention is that it provides an aesthetically pleasing, colored, non-marking, low maintenance long term solution to floor and other concrete and cementicious surfaces wherein the color is locked in.

Briefly and basically, in accordance with the present invention, a method of polishing and coloring a concrete surface is provided where there is dry grinding of a concrete or other cementicious surface using a series of finer grinding grits. The process includes extraction and retention of dust generated during the grinding process. The steps of the dry grinding are repeated each time using a finer grinding grit. After one or more of the grinding steps, after grinding at a preselected grit, a dye is applied to said concrete surface. After the dye dries, a coat of sealer is applied to the concrete surface then one or more grinding steps are continued with sequentially finer grinding grits after the sealer has dried. Finally, a second coat of sealer is applied to said concrete or cementicious surface which has been ground to a preselected degree of smoothness and colored.

In a present preferred embodiment in accordance with the present invention, the preselected grit prior to applying said dye is substantially 400 grit.

In a presently preferred embodiment, the dye is prepared by mixing dye powder with acetone. Further, in a presently preferred embodiment, the dye powder is mixed in equal parts with acetone.

DETAILED DESCRIPTION OF THE PREFERRED EMBODIMENTS

A concrete or other cementicious surface such as a floor, wall or other surface may be treated in accordance with the present invention by first grinding the concrete surface. Preferably, the grinding is carried out in a plurality of steps using a finer grit during each grinding step. In a presently preferred form of practicing the invention, a diamond grinding system is utilized in the grinding process. The dry grinding is carried out using an apparatus which will create a vacuum or suction to remove dust from the grinding and retain it in a container during the grinding process. The dust container may be emptied periodically.

In practicing the present invention in accordance with a preferred method, a grinding machine HTC-800 available from HTC Sweden AB-Box 69-614 22 Soderkoping, Sweden is one of the presently preferred machines. However, it is understood that other grinding machines may be utilized. The HTC-800 is commercially available in the United States through Innovatech, 19722 144th Ave. NE, Woodinville, Wash. 98072. The HTC-800 utilizes three grinding disks that rotate in one direction, and are mounted on a larger disk which rotates in the opposite direction. The smaller grinding disks may rotate at up to 1300 revolutions per minute. This makes the machine easy to handle and control while producing a smooth even surface.

The grinding may be carried out on portions of a floor while other portions of the same floor are being utilized for the conduct of business. This is made possible because the grinding is carried out and the dust and dirt are removed by vacuum or suction as the grinding is carried out. The grinding is carried out through mechanical dust-free and water-free, flat grinding and polishing.

In accordance with the method of coloring in accordance with the present invention, a dye is applied to the concrete or cementicious surface after successful completion of a predetermined or preselected grit polishing step. In accordance with a presently preferred embodiment of the present invention, the dye is applied after completion of grinding using 400 grit grinding disks and before the next desired polishing step.

By way of example and not by way of limitation, a typical protocol of the series of finer grinding grits may be as follows:

34/40 metal abrasive grit
60/80 metal abrasive grit
120/150 metal abrasive grit
300 phenolic grit
400 phenolic grit
800 grit
1500 grit
3000 grit Of course, there may be variations in the degree of fineness of the various disk grits. Depending upon the desired degree of smoothness, the polishing may end with a 800 grit disks. However, for a high luster, the grinding would continue up to about 3000 grit disks.

The dye is formulated using extremely fine molecules of color designed to penetrate and color interior concrete. In a presently preferred method of practicing the invention, the dye is a dye manufactured by American Decorative Concrete Supply Co. of Springdale, Ark. This powered dye is commercially available from distributors of L & M Construction Chemicals, Inc., 14851 Calhoun Road, Omaha, Nebr. 68152 sold under the trademark "VIVID CONCRETE DYE". The dye is packaged in pre-measured units that mix with a corresponding amount of acetone solvent of either one gallon or five gallon increments. In other words, one gallon of powder would mix with one gallon of acetone. The dye is preferably applied with a cone tip pump sprayer compatible with acetone to spray a uniform coat on the ground concrete surface avoiding puddling. By way of example and not by way of limitation, the approximate coverage is about 400 to 600 square feet per diluted gallon of dye.

In preparing the dye for application, a pre-measured container of dye powder is emptied into a special acetone resistant container containing an equal amount of acetone solvent. The container is shaken vigorously and then the contents is allowed to dissolve for a minimum of three hours before use to allow colors to blend. Immediately before application of the dye, shake the container well again to insure that all of the dye is mixed with acetone. The dye sold under the trademark "VIVID CONCRETE DYE" is formulated using extremely fine molecules of color designed to penetrate and color any interior concrete surface. The dye powder is commercially available in 24 standard colors. The colors can be combined to create an unlimited number of color variations.

After the dye is applied with the cone tip pump sprayer, the surface is mechanically dry buffed with a soft white pad and dust mop to remove any residue before proceeding to the next step.

Once the floor is dry after the installation of the dye, the next step is to install one coat of sealer. This sealer may be any suitable water based, odorless, penetrating alkaline siliconate solution. In a presently preferred method of practicing the present invention, the sealer is that which is commercially available from distributors of L & M Construction Chemicals, Inc. sold under the trademark "FGS HARDENER PLUS".

After the sealer is dry, the next grinding/polishing step is completed. In a presently preferred embodiment, the dye and sealer are sequentially applied after using the 400 grit grinding disks or disks close to 400 grit. The step of polishing after applying in sequence the dye and sealer is preferably the polishing step using the 800 grit disks. However, it is understood that other grits may be utilized such as 600 or 700 after application of the dye in the first coat of sealer. By proceeding in this manner or accordance with the process of the present invention, the dye is locked into the pores of the concrete. In accordance with an example of a presently preferred embodiment of the present invention after polishing with the 800 grit disk, the cementicious or concrete surface may be polished with succeedingly finer grit such as 1500 grit and 3000 grit disks. As the last step, a second coat of sealer is applied, such as the "FGS HARDENER PLUS".

In view of the above, the present invention may be embodied in other specific forms without departing from the spirit or essential attributes thereof and, accordingly, reference should be made to the appended claims, rather than to the foregoing specification as indicating the scope of the invention.

We claim:

1. A method of polishing and coloring a concrete surface, comprising:
    dry grinding a concrete or cementicious surface to be treated using a grinding grit;
    extraction and retention of dust generated during the grinding process;
    repeating the dry grinding process each time using a finer grinding grit;
    after two or more grinding steps, after a grinding at a preselected grit, applying a dye to said concrete or cementicious surface;
    applying a coat of sealer to said surface;
    continuing one or more grinding steps after said sealer has dried; and
    applying a second coat of sealer to said concrete or cementicious surface which has been ground to a preselected degree of smoothness.

2. A method in accordance with claim 1 wherein said dye applied to said concrete or cementicious surface is prepared from a dye powder mixed in acetone.

3. A method in accordance with claim 1 wherein said dye is applied to said concrete surface using a cone shaped spray nozzle.

4. A method in accordance with claim 1 wherein said preselected grit prior to applying said dye is substantially 400 grit.

5. A method in accordance with claim 4 wherein said polishing is carried out in repeated steps using finer grits until a grit of 3,000 is used.

6. A method in accordance with claim 1 wherein said step of extraction is by means of generating at least a partial vacuum to remove dust during the grinding process.

7. A method in accordance with claim 1 wherein said step of extraction of dust during the grinding process is by means of suction.

8. A method in accordance with claim 1 wherein said sealer is a water based, odorless, penetrating alkaline silicone solution.

* * * * *